(12) United States Patent
Hatakeyama (10) Patent No.: US 9,804,481 B2
(45) Date of Patent: Oct. 31, 2017

(54) LENS ACCESSORY, LENS APPARATUS, AND IMAGE PICKUP APPARATUS

(71) Applicant: CANON KABUSHIKI KAISHA, Tokyo (JP)

(72) Inventor: Yasuhiro Hatakeyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/421,696

(22) Filed: Feb. 1, 2017

(65) Prior Publication Data

US 2017/0235212 A1      Aug. 17, 2017

(30) Foreign Application Priority Data

Feb. 15, 2016   (JP) ................ 2016-025743

(51) Int. Cl.
| G03B 17/56 | (2006.01) |
| G02B 15/12 | (2006.01) |
| G02B 7/04 | (2006.01) |
| H04N 5/225 | (2006.01) |

(52) U.S. Cl.
CPC ............ *G03B 17/561* (2013.01); *G02B 7/04* (2013.01); *G02B 15/12* (2013.01); *H04N 5/2254* (2013.01)

(58) Field of Classification Search
CPC .. G03B 17/14; G03B 17/561; H04N 5/23209; H04N 5/2254; H04N 5/23296; G02B 7/04; G02B 7/14; G02B 7/10; G02B 15/12

See application file for complete search history.

(56) References Cited

FOREIGN PATENT DOCUMENTS

| JP | H5-249356 A | 9/1993 |
| JP | 2001117150 A | 4/2001 |
| JP | 2002287241 A | 10/2002 |
| JP | 2006227118 A | 8/2006 |
| JP | 2007108373 A | 4/2007 |

*Primary Examiner* — Twyler Haskins
*Assistant Examiner* — Angel L Garces-Rivera
(74) *Attorney, Agent, or Firm* — Rossi, Kimms & McDowell LLP (57) ABSTRACT

A lens accessory (1) is detachably attached to a lens barrel (2), and includes a first holder (104) and a second holder (105) for holding the lens barrel, an operation member (102) that moves at least one holder of the first holder and the second holder between a first position and a second position, and a biasing mechanism (110) that applies a biasing force to the at least one holder so as to hold the lens barrel, the biasing mechanism includes a first biasing member and a moving member that moves the at least one holder from the first position to the second position according to an operation of the operation member via the first biasing member, and when the at least one holder contacts the lens barrel, the first biasing member is displaced by the moving member.

16 Claims, 9 Drawing Sheets

LENS ACCESSORY, LENS APPARATUS, AND IMAGE PICKUP APPARATUS

BACKGROUND OF THE INVENTION

Field of the Invention

The present invention relates to a lens accessory that is detachably attached to a lens apparatus, and more particularly to a lens drive adapter that is capable of driving an operation member of the lens apparatus.

Description of the Related Art

Previously, as an accessory that can be attached to a cylindrical lens barrel, there are a lens drive adaptor (power zoom apparatus) that includes an actuator for performing an electric operation of an operation ring of the lens barrel and a tripod mount that can be attached to the lens barrel for attaching a tripod.

Japanese Patent Laid-open No. 2007-108373 discloses a power zoom apparatus which is fixed to a lens barrel with screws. Japanese Patent Laid-open No. H05-249356 discloses a lens barrel holding apparatus which fastens a whole circumference of the lens barrel.

However, when the power zoom apparatus is being attached to the lens barrel by the screws as disclosed in Japanese Patent Laid-open No. 2007-108373, it is necessary to prepare a tool such as a screwdriver and fasten the two screws. Therefore, the attachment and detachment of the power zoom apparatus cannot be easily performed. The lens barrel holding apparatus disclosed in Japanese Patent Laid-open No. H05-249356 can perform fitting of the outside diameter by a screw, but it cannot be attached to a lens barrel with a small outside diameter. Furthermore, this lens barrel holding apparatus can be attached to a lens barrel with a large outside diameter, but it is necessary to be strong the fastening force by the screw and as a result an optical performance of the lens barrel may be deteriorated.

SUMMARY OF THE INVENTION

The present invention provides a lens accessory, a lens apparatus, and an image pickup apparatus that are easily attached to various lens barrels with different sizes of outside diameters and that are capable of suppressing a deterioration of an optical performance of the lens barrel.

A lens accessory as one aspect of the present invention is detachably attached to a lens barrel, and including a first holder and a second holder configured to hold the lens barrel, an operation member configured to move at least one holder of the first holder and the second holder between a first position and a second position, and a biasing mechanism configured to apply a biasing force to the at least one holder so as to hold the lens barrel, the biasing mechanism includes a first biasing member and a moving member that moves the at least one holder from the first position to the second position according to an operation of the operation member via the first biasing member, and when the at least one holder contacts the lens barrel, the first biasing member is displaced by the moving member.

A lens apparatus as another aspect of the present invention includes a lens barrel and the lens accessory.

An image pickup apparatus as another aspect of the present invention includes the lens apparatus and an image sensor configured to photoelectrically convert an optical image formed via the lens barrel to output image data.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figures 1A, 1B:
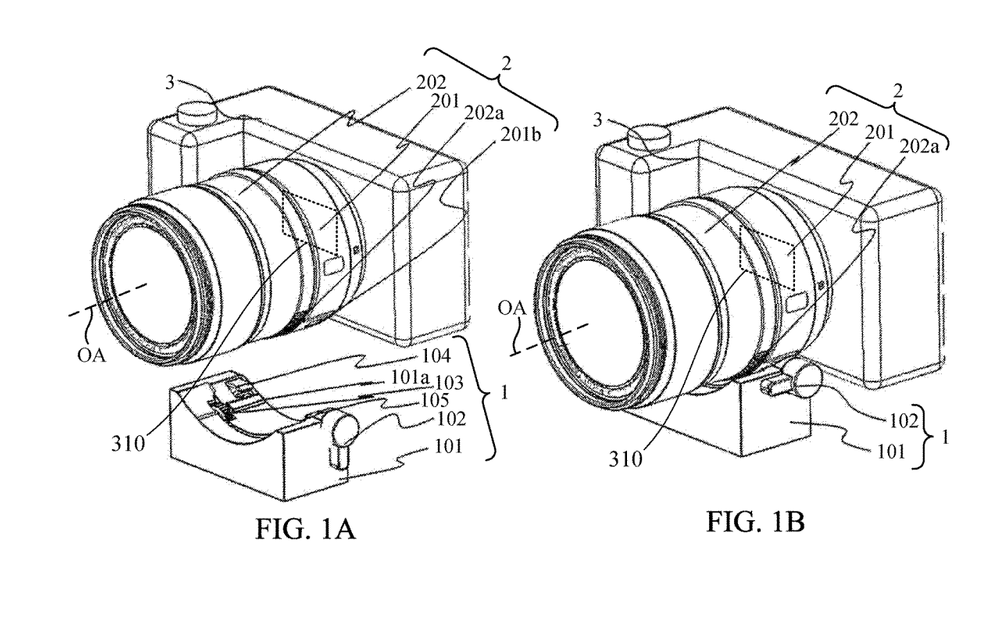
FIGS. 1A and 1B are external perspective views of a lens drive adapter, a lens barrel, and an interchangeable lens camera in this embodiment.
Figure 2A:
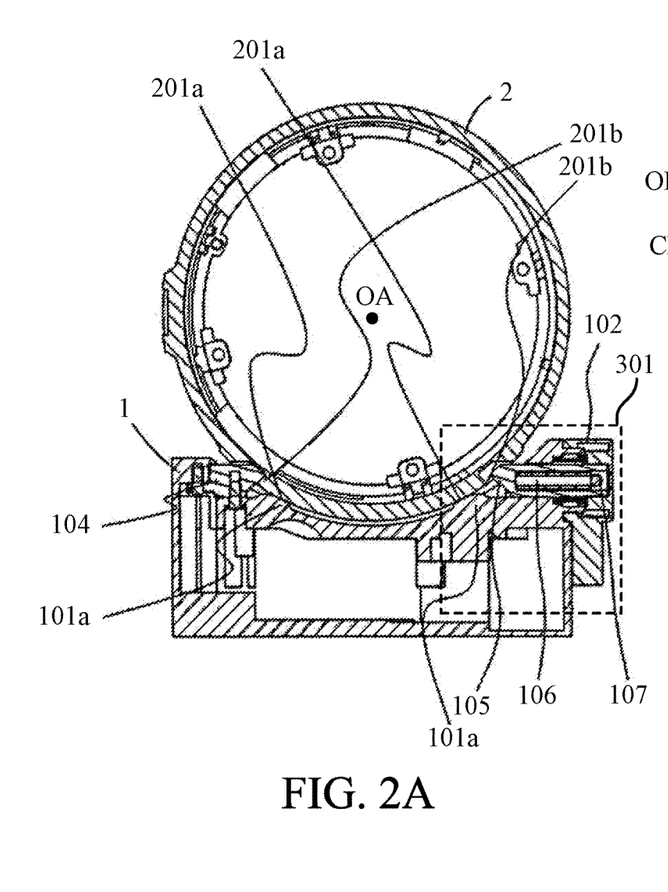
FIGS. 2A and 2B are cross-sectional views of the lens drive adapter and the lens barrel in this embodiment.
Figure 2B:
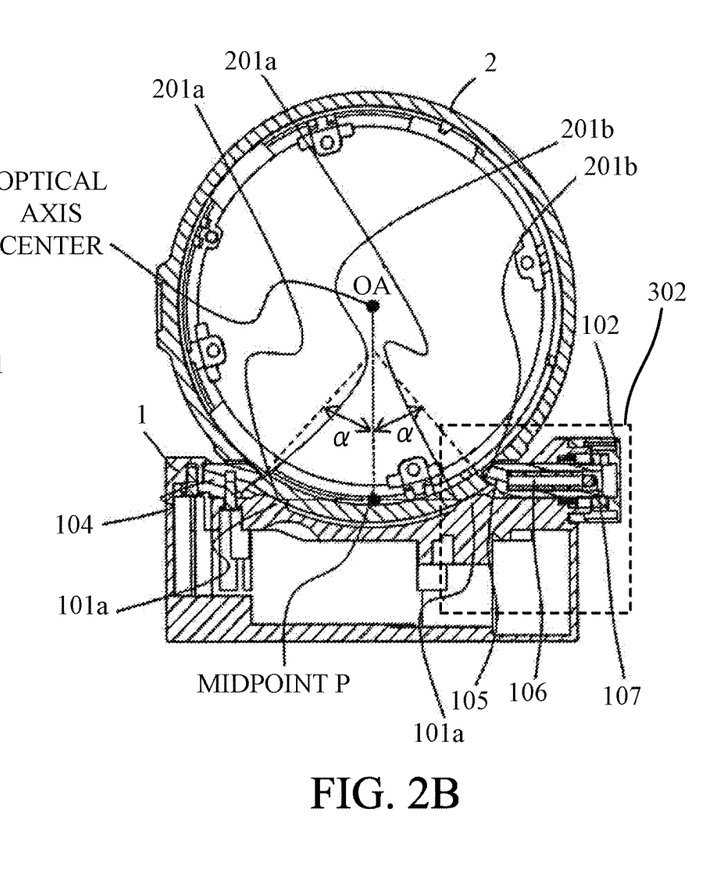
Figure 3A:
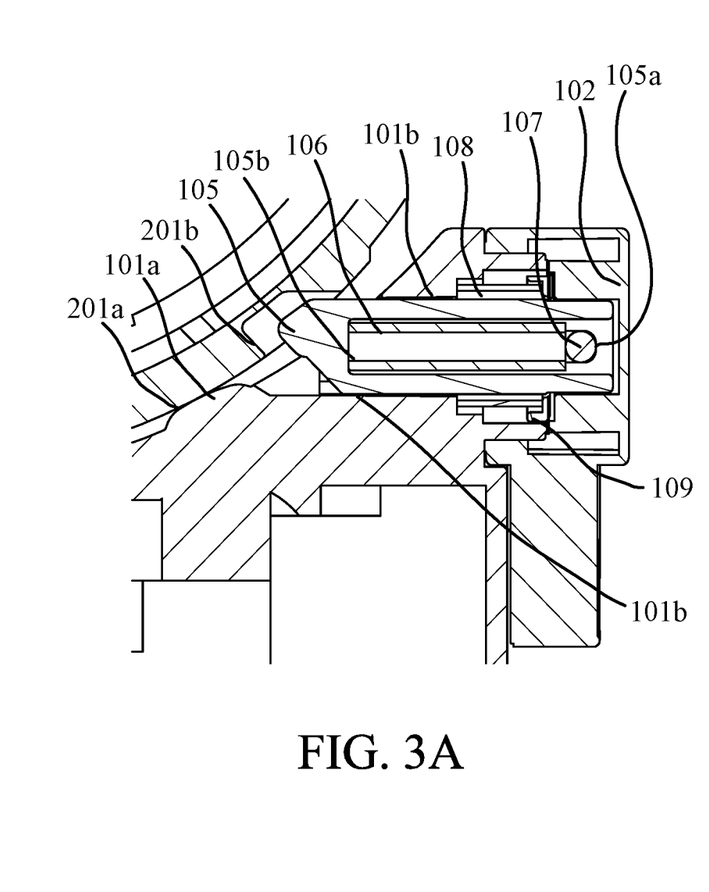
FIGS. 3A and 3B are enlarged cross-sectional views of main parts of the lens drive adapter and the lens barrel in this embodiment.
Figure 3B:
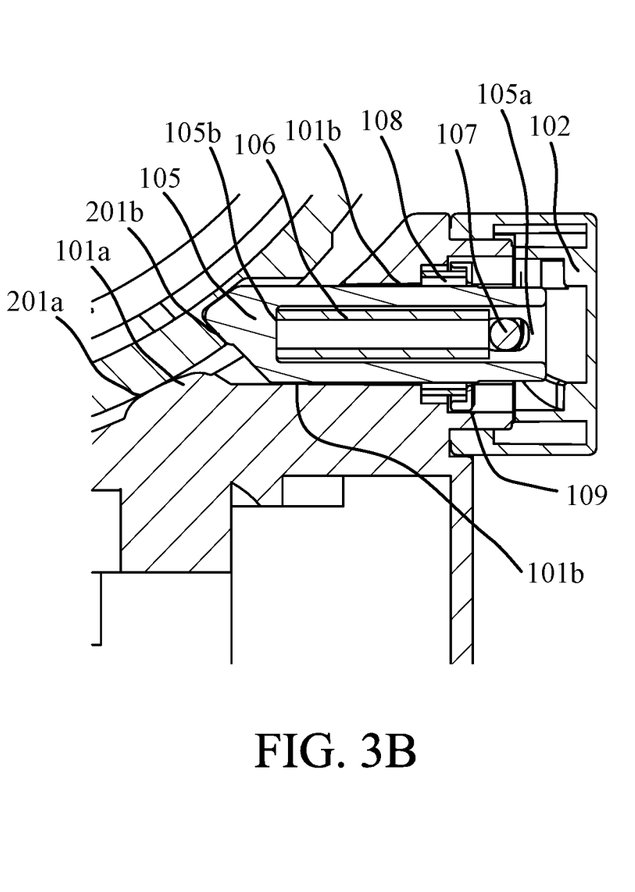
Figure 4:
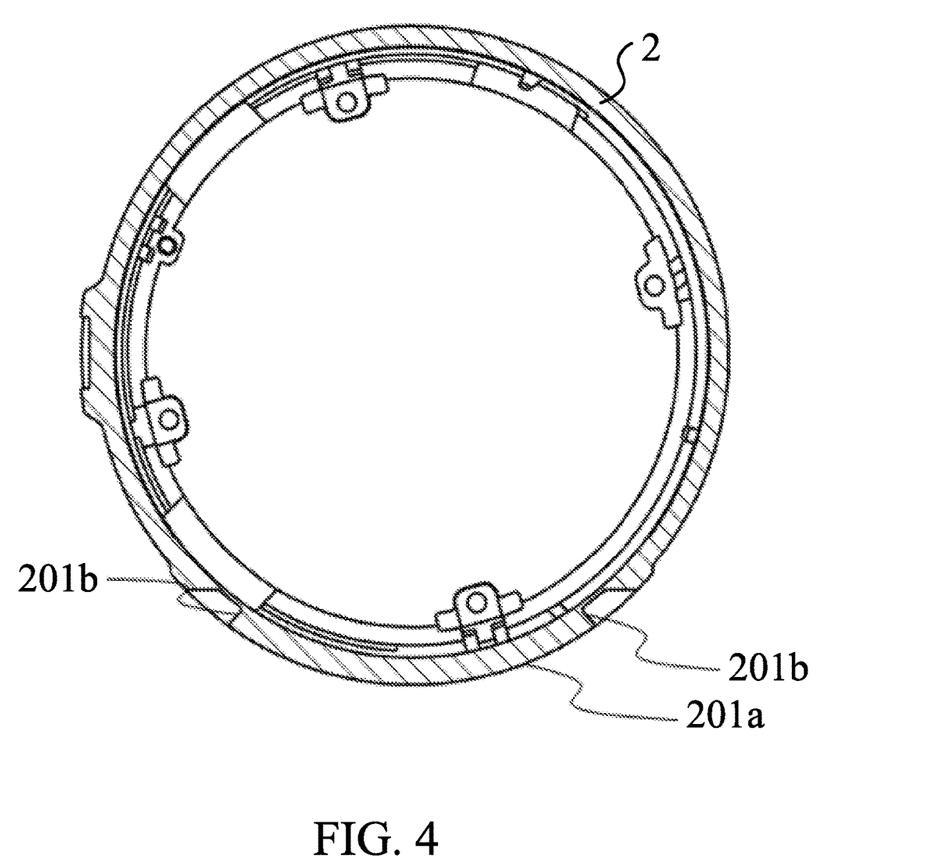
FIG. 4 is a cross-sectional view of the lens barrel in this embodiment.

First, referring to FIGS. 1A to 4, a configuration of a lens drive adapter (lens accessory) in this embodiment will be described. FIGS. 1A and 1B are external perspective views of a lens drive adaptor (optical drive apparatus) 1, a lens barrel (lens apparatus) 2, and an interchangeable lens camera (image pickup apparatus) 3 in this embodiment. FIG. 1A illustrates a state where the lens drive adaptor 1 is detached from the lens barrel 2, and FIG. 1B illustrates a state where the lens drive adaptor 1 is attached to the lens barrel 2. FIGS. 2A and 2B are cross-sectional views of the lens drive adaptor 1 and the lens barrel 2. FIGS. 3A and 3B are enlarged cross-sectional views of main parts of the lens drive adaptor 1 and the lens barrel 2. FIG. 2A illustrates a state where the lens drive adaptor 1 is not fixed to the lens barrel 2, and FIG. 2B illustrates a state where the lens drive adaptor 1 is attached and fixed to the lens barrel 2. FIG. 3A is an enlarged view of a region 301 illustrated in FIG. 2A, and FIG. 3B is an enlarged view of a region 302 illustrated in FIG. 2B. FIG. 4 is a cross-sectional view of the lens barrel 2.

The lens barrel 2 is provided with an image pickup optical system (not illustrated) including a plurality of lens units and an aperture stop in its inside. The interchangeable lens camera 3 includes an image sensor 310 that photoelectrically converts an optical image formed via the lens barrel 2 (image pickup optical system) to output image data. The lens barrel 2 is provided with an exterior ring (fixed portion) 201 and an operation ring (operation member) 202 on its outer surface. The operation ring 202 is rotatable around an optical axis OA of the lens barrel 2 as a rotation center. A predetermined lens unit of the plurality of lens units included in the image pickup optical system moves in a direction along the optical axis OA (i.e., optical axis direction) according to a rotation of the operation ring 202. In this configuration, a focal length can be changed for zooming, or a focus adjustment (focusing) can be performed. The operation ring 202 is provided with a driven gear 202a. The operation ring 202 rotates according to a drive force transmitted from a lens driver 103 described below via the driven gear 202a.

The lens drive adaptor 1 is detachably attached to the lens barrel 2. Reference numeral 101 denotes a case that constitutes a main body of the lens drive adaptor 1 (i.e., accessory body). Reference numeral 102 denotes an attaching and detaching operation portion (operation member) that operates when the lens drive adaptor 1 is being attached to the lens barrel 2. Reference numeral 103 denotes a lens driver. The lens driver 103 includes an actuator such as a DC motor and a speed reducer inside the case 101 of the lens drive adaptor 1.

The exterior ring 201 of the lens barrel 2 is provided with a contact receiving portion 201a that contacts the case 101 of the lens drive adaptor 1 and a held surface 201b (sandwiched surface) that is held (i.e., sandwiched) by the lens drive adaptor 1. It is preferred that an angle of the held surface 201b is set so that an inferior angle α with respect to a line that connects a midpoint P between contact points where the contact receiving portion 201a and a pair of contact portions 101a described above contact each other with an optical axis center of the lens barrel 2 is an acute angle (predetermined angle). The held surface 201b is set to the predetermined angle in order to generate a force caused by the holding in a direction where the lens drive adaptor 1 is pulled to the lens barrel 2. Accordingly, when the position is held by a friction force of the holder (held surface 201b), the angle of the held surface 201b does not need to be set to the predetermined angle.

The case 101 of the lens drive adaptor 1 is provided with the pair of contact portions 101a that contact the contact receiving portion 201a of the lens barrel 2. A fixed holder 104 (fixed sandwiching portion) of the lens drive adaptor 1 is fixed to the case 101 via a screw. A movable holder 105 (movable sandwiching portion) of the lens drive adaptor 1 is restricted in its moving direction by a straight advancing guide 101b formed on the case 101. The movable holder 105 is capable of advancing and retracting inside the straight advancing guide 101b of the case 101 by an advancing and retracting mechanism (biasing mechanism 110) described above, and it is biased in a direction toward the fixed holder 104. In this embodiment, the fixed holder 104 is fixed to the case 101 as a separate component, or alternatively the fixed holder 104 may be configured integrally with the case 101.

When the lens drive adaptor 1 is being attached to the lens barrel 2, the contact portion 101a of the lens drive adaptor 1 contacts the contact receiving portion 201a of the lens barrel 2 to hold the held surface 201b by using the fixed holder 104 and the movable holder 105 of the lens drive adaptor 1. Thus, the lens drive adaptor 1 is fixed to be pulled toward the lens barrel 2.

Figure 5:
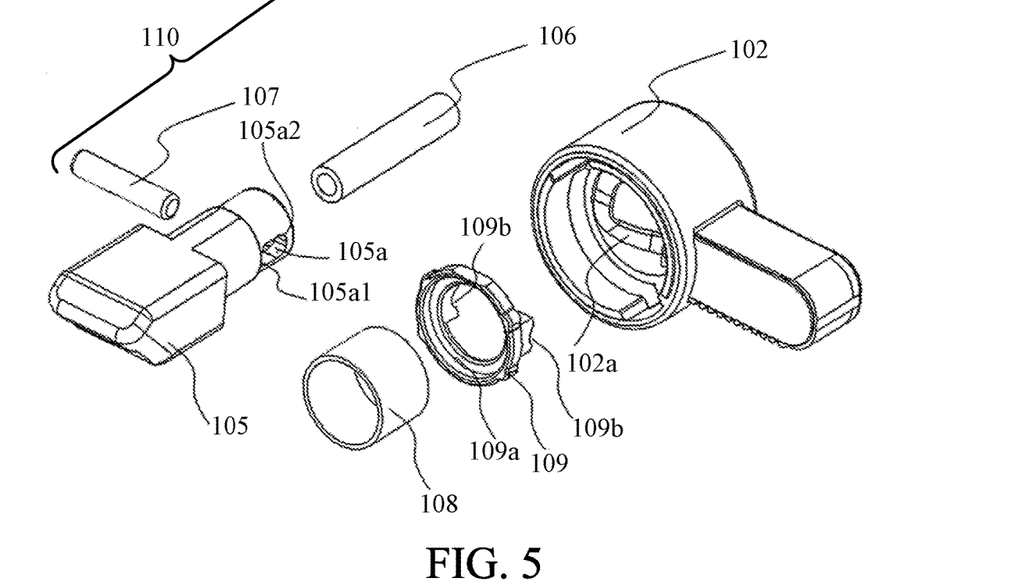
FIG. 5 is an exploded perspective view of an advancing and retracting mechanism of a movable holder in this embodiment.
Figure 6A:
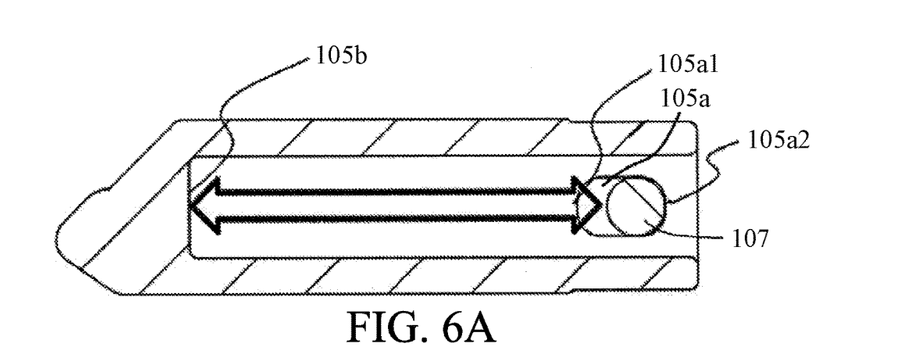
FIGS. 6A and 6B are explanatory diagrams of an advancing and retracting movement of the movable holder in this embodiment.
Figure 6B:
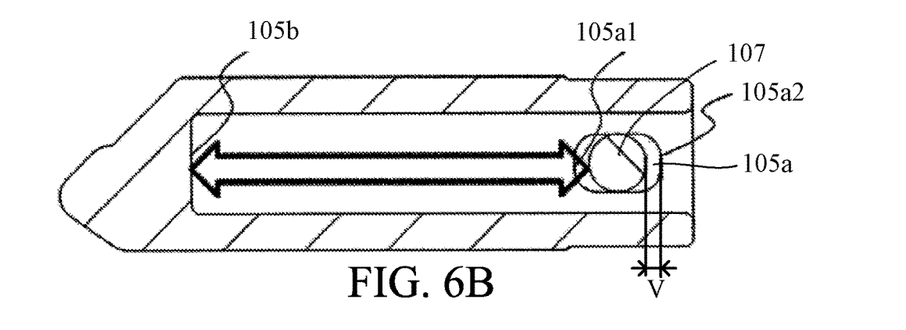
Figure 7A:
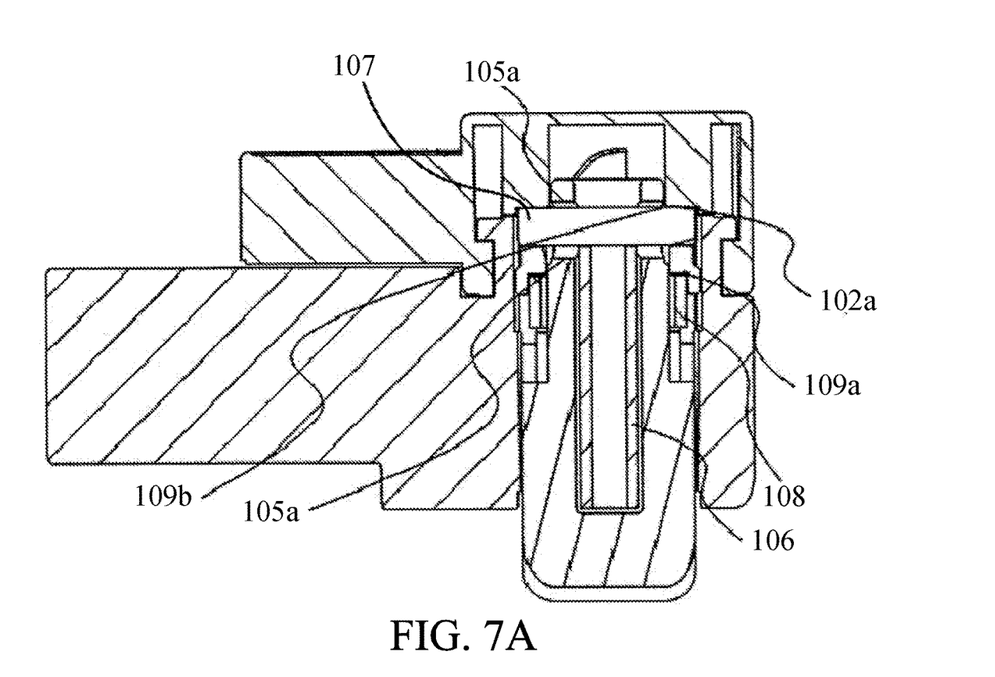
FIGS. 7A and 7B are cross-sectional views of the advancing and retracting mechanism of the movable holder in this embodiment.
Figure 7B:
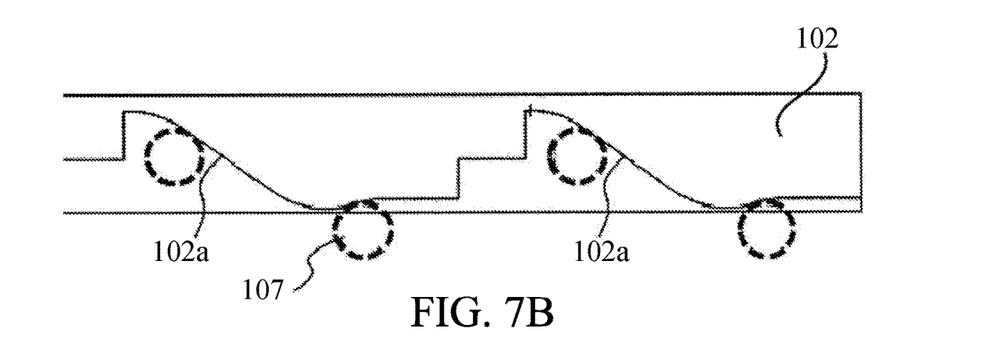

Next, referring to FIGS. 5 to 7B, the advancing and retracting mechanism (biasing mechanism 110) of the movable holder 105 of the lens drive adaptor 1 will be described. FIG. 5 is an exploded perspective view of the advancing and retracting mechanism of the movable holder 105. FIGS. 6A and 6B are explanatory diagrams of an advancing and retracting movement of the movable holder 105. FIG. 7A is a cross-sectional view of the advancing and retracting mechanism (biasing mechanism) of the movable holder 105, and FIG. 7B is an explanatory diagram of an attaching and detaching operation portion 102 and a biasing pin (moving member) 107.

As illustrated in FIGS. 6A and 6B, the biasing pin 107 is inserted into an elongate hole 105a that is formed on the movable holder 105. The biasing pin 107 is biased so as to be movable within a predetermined range (within a range where the biasing pin 107 is movable in the elongate hole 105a, or between end portions 105a1 and 105a2) by a biasing spring 106 held between a biasing receiving surface 105b of the movable holder 105 and the biasing pin 107. A spring receiving member 109 biases the biasing pin 107 in a retracting direction by using a pin receiving portion 109b, and the spring receiving portion 109a is biased by an evacuation spring 108. As illustrated in FIG. 7B, the biasing pin 107 is always biased to an inclined surface (slope) 102a of the attaching and detaching operation portion 102 by using the evacuation spring 108 via the spring receiving member 109. The attaching and detaching operation portion 102 is held by a bayonet mechanism or the like so as to be rotatable with respect to the case 101 of the lens drive adaptor 1 according to a rotational operation by a user. In this embodiment, for example, the biasing mechanism 110 is constituted by the biasing spring 106, the biasing pin 107, the evacuation spring 108, and the spring receiving member 109.

As illustrated in FIG. 3A, when the lens drive adaptor 1 is not fixed to the lens barrel 2, the movable holder 105 is biased to the inclined surface 102a (see FIG. 5) of the attaching and detaching operation portion 102 via the biasing pin 107 to be located at a retracted position, i.e., first position (in a retraction state). When the user rotates the attaching and detaching operation portion 102 in this state, the spring pin 107 moves the movable holder 105 via the biasing spring 106 to a hold position, i.e., second position, along the inclined surface 102a of the attaching and detaching operation portion 102. As a result, as illustrated in FIG. 3B, the lens drive adaptor 1 is attached and fixed to the lens barrel 2.

FIG. 6A illustrates a relationship between the biasing pin 107 and the elongate hole 105a of the movable holder 105 when the attaching and detaching operation portion 102 rotates while the lens drive adaptor 1 is not attached to the lens barrel 2. FIG. 6B illustrates a relationship between the biasing pin 107 and the elongate hole 105a of the movable holder 105 when the attaching and detaching operation portion 102 rotates while the lens drive adaptor 1 is attached to the lens barrel 2. As illustrated in FIG. 6A, when the lens barrel 2 is not attached (i.e., there is no counter member), the biasing pin 107 maintains a state of contacting a right end (end portion 105a2) of the elongate hole 105a of the movable holder 105 even if the attaching and detaching operation portion 102 rotates. On the other hand, as illustrated in FIG. 6B, when the lens barrel 2 is attached (i.e., there is a counter member), the spring pin 107 moves from the right end (end portion 105a2) of the elongate hole 105a to the left side (toward the end portion 105a1) if the attaching and detaching operation portion 102 rotates. It is preferred that a clearance V (see FIG. 6B) between the biasing pin 107 and the elongate hole 105a in an advancing and retracting direction is set by considering deviation of component tolerance relating to a width of the held surface 201b and deviation of component tolerance relating to a width between the fixed holder 104 and the movable holder 105 in an attached state. As illustrated in FIG. 3B, when the lens drive adaptor 1 is attached to the lens barrel 2, a biasing force of the biasing spring 106 can be given to the movable holder 105 by the elongate hole 105*a* of the movable holder 105.

Figure 10A:
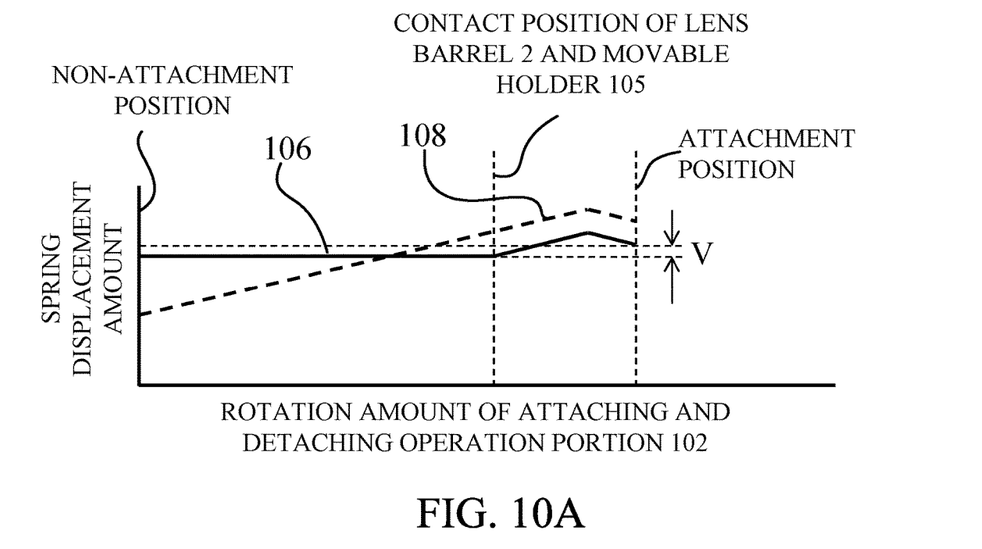
FIGS. 10A and 10B are conceptual diagrams of illustrating a relationship between an evacuation spring and a biasing spring in this embodiment.
Figure 10B:
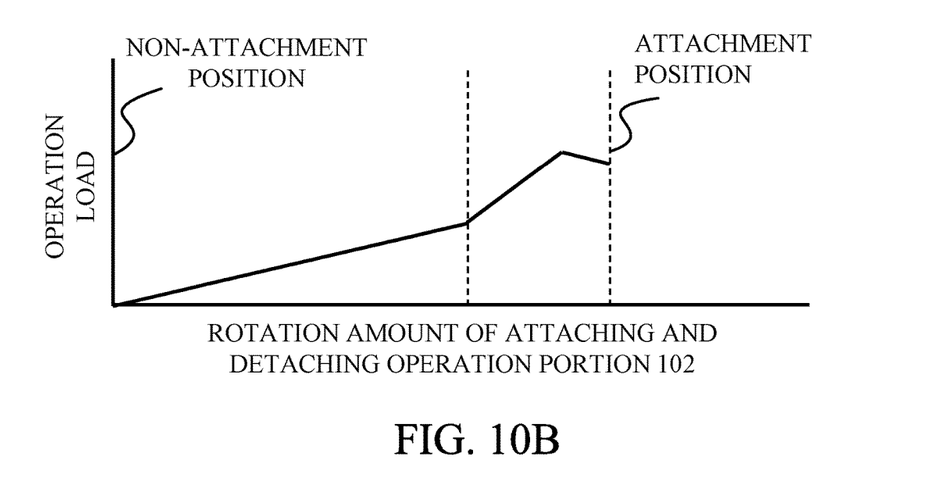

FIGS. 10A and 10B are conceptual diagrams of displacement amounts of the biasing spring 106 and the evacuation spring 108 (spring displacement amounts) during attaching and detaching operations and a load applied to an attachment member (operation load). In FIG. 10A, a horizontal axis indicates a rotation amount of the attaching and detaching operation portion 102, and a vertical axis indicates the operation load. During the attaching operation, the load of the evacuation spring 108 is only applied to the attaching and detaching operation portion 102 via the inclined surface 102*a* before the movable holder 105 contacts the lens barrel 2. When the movable holder 105 contacts the lens barrel 2, the biasing pin 107 moves inside the elongate hole 105*a* while the movable holder 105 neither advances nor retracts (i.e., does not move) from the contact position, and as a result the biasing spring 106 is displaced and its biasing force is applied to the attaching and detaching operation portion 102 via the inclined surface 102*a*. During the retracting operation, the force of the evacuation spring 108 that is applied during the attaching operation is given as it is via the inclined surface 102*a* as a rotational force for moving the attaching and detaching operation portion 102 to the retracted position.

Figure 8A:
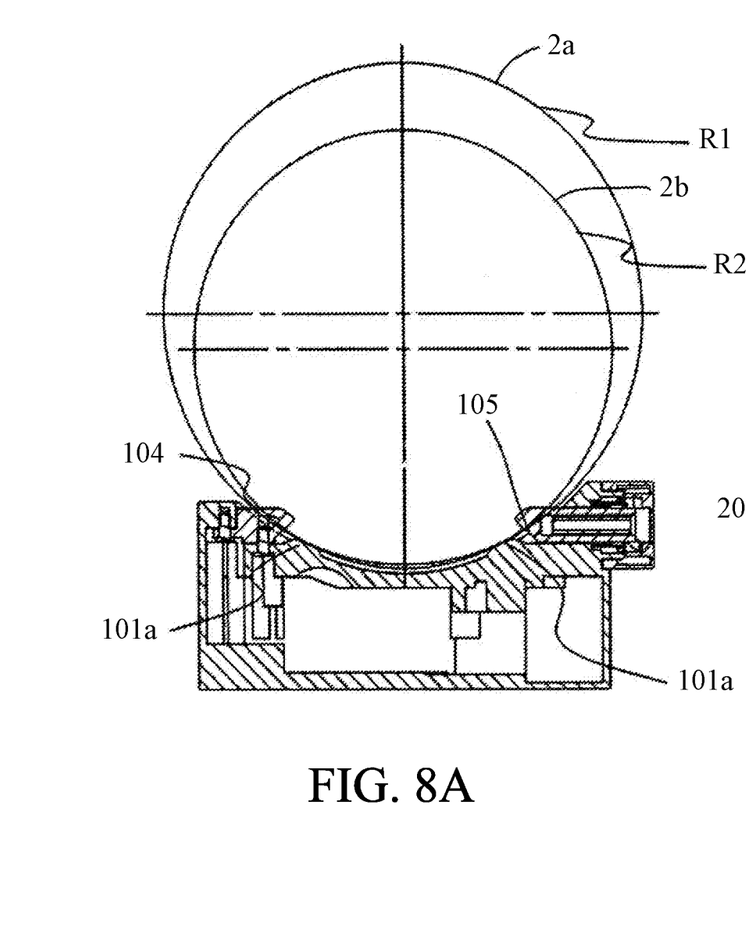
FIGS. 8A and 8B are explanatory diagrams of attaching the lens drive adapter to various lens barrels with different outside diameters in this embodiment.
Figure 8B:
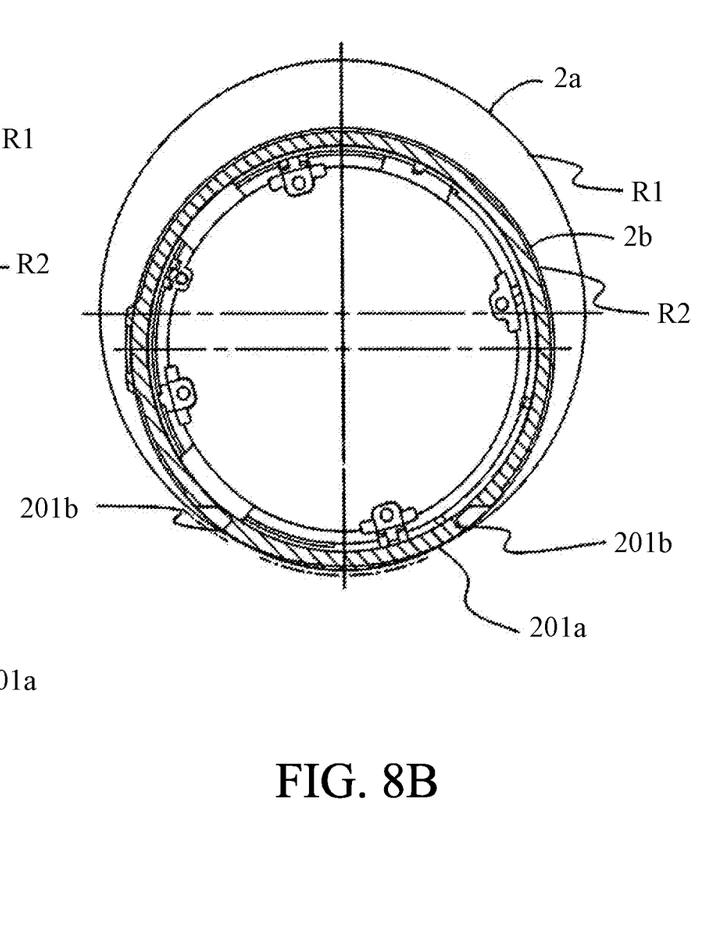

Next, referring to FIGS. 8A and 8B, a case where the lens drive adaptor 1 is being attached to various lens barrels with different outside diameters will be described. FIGS. 8A and 8B are explanatory diagrams of the attachment of the lens drive adaptor 1 to the various lens barrels with different outside diameters. FIGS. 8A and 8B illustrate the lens drive adaptor 1 which can be attached to each of a lens barrel 2*a* with an outside diameter R1 (first radius of curvature) and a lens barrel 2*b* with an outside diameter R2 (second radius of curvature). For any of various lens barrels (lens barrels 2*a* and 2*b*) with different outside diameters, the lens drive adaptor 1 can be attached to each lens barrel by designing an interval of (i.e., distance between) the held surfaces 201*b* to be identical.

While this embodiment describes the lens drive adaptor 1 which is capable of driving the operation ring 202 of the lens barrel 2, it is not limited thereto. This embodiment can be applied to various lens accessories which can be attached to and detached from the lens barrel 2.

Figure 9:
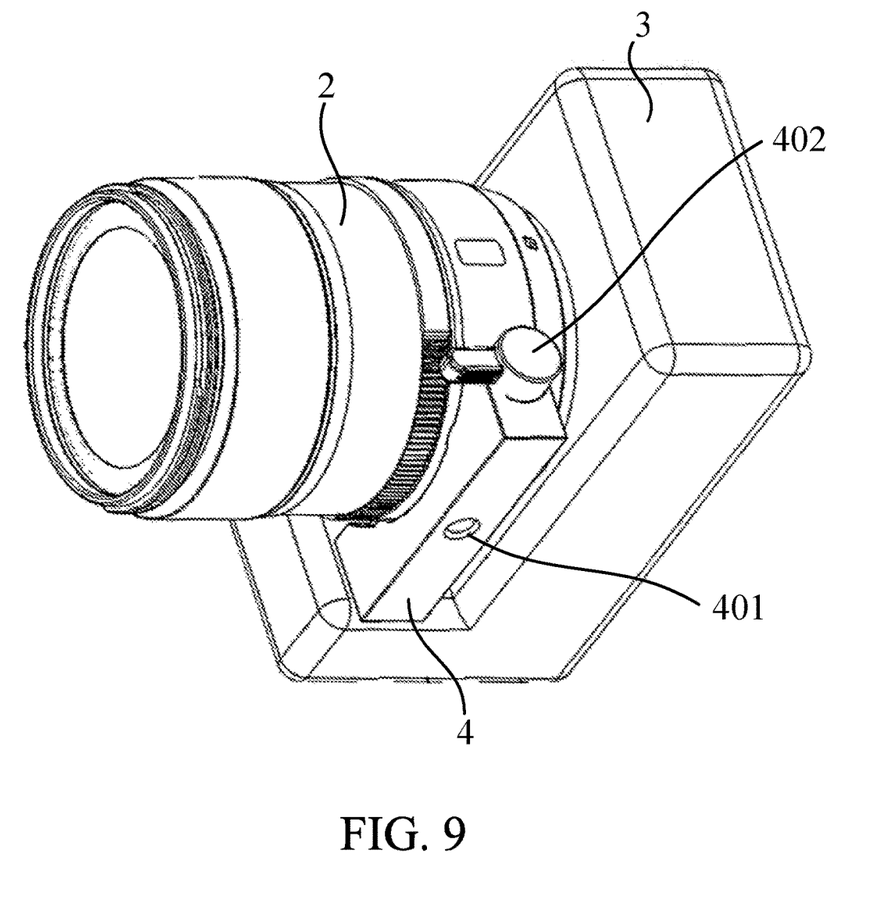
FIG. 9 is an external perspective view of illustrating a state where a tripod mount accessory is attached to the lens barrel in this embodiment.

FIG. 9 is an external perspective view of illustrating a state where a tripod mount accessory 4 (lens accessory) that is used for attaching a tripod is attached to the lens barrel 2. A tripod screw hole 401 for attaching the tripod is formed on the tripod mount accessory 4. The tripod accessory 4 includes an attaching and detaching operation portion 402 for moving a movable holding member (not illustrated). The attaching and detaching operation portion 402 has a function that is similar to that of the attaching and detaching operation portion 102 of the lens drive adaptor 1 described above. In this configuration, similarly to the lens drive adaptor 1, the tripod mount accessory 4 can be attached to and detached from the various lens barrels with different outside diameters.

As described above, in this embodiment, the lens accessory (lens drive adaptor 1) is detachably attached to the lens apparatus 2, and it includes a first holder (fixed holder 104) and a second holder (movable holder 105) that hold the lens barrel 2. The lens accessory further includes an operation member (attaching and detaching operation portion 102) that is capable of moving at least one holder of the first holder and the second holder between a first position and a second position. The lens accessory further includes a biasing mechanism 110 that applies a biasing force to the at least one holder of the first holder and the second holder so as to hold the lens barrel 2. The biasing mechanism includes a first biasing member (biasing spring 106) and a moving member (biasing pin 107) that moves the at least one holder from the first position to the second position according to an operation of the operation member via the first biasing member. When the at least one holder contacts the lens barrel, the first biasing member is displaced by the moving member.

Preferably, the moving member is biased by the first biasing member so as to be movable relatively to the at least one holder according to a movement of the at least one holder from the first position to the second position. Preferably, the operation member moves at least one of the first holder and the second holder between the first position and the second position according to a rotational operation of the operation member.

Preferably, the first position is a position (retraction position) where at least one of the first holder and the second holder is retractable from the lens barrel. The second position is a position (hold position or attachment position) where the lens barrel can be held by using the first holder and the second holder.

Preferably, the first holder is fixed, and the second holder moves between the first position and the second position according to the operation (rotational operation) of the operation member. More preferably, the biasing mechanism includes a second biasing member (evacuation spring 108) that biases the second holder in a second direction (retracting direction) opposite to a first direction (holding direction). More preferably, the first biasing member is biased in the first direction by the moving member, and the second biasing member is biased in the second direction by the moving member. More preferably, the first biasing member is provided between a receiving surface (biasing receiving surface 105*b*) of the second holder and the moving member.

Preferably, the biasing mechanism includes a transmission member (spring receiving member 109) that transmits a biasing force of the second biasing member to the moving member. Preferably, the operation member changes a biasing force in the first direction that is applied to the second holder by the first biasing member according to the rotational operation of the operation member. More preferably, the operation member is provided with an inclined surface 102*a* to change the biasing force, and the moving member is biased to the inclined surface 102*a* of the operation member by the second biasing member. More preferably, the moving member moves while maintaining a state of contacting the inclined surface 102*a* of the operation member to move the second holder between the first position and the second position according to the rotational operation of the operation member. More preferably, the moving member is inserted into an elongate hole formed on the second holder, the elongate hole of the moving member includes a first end portion (end portion 105*a*1) that restricts a movement of the moving member in the first direction and a second end portion (end portion 105*a*2) that restricts a movement of the moving member in the second direction. In this case, the moving member is biased toward the second end portion according to a reaction force of the biasing force by the first biasing member.

According to this embodiment, the lens drive adaptor 1 can be attached to and detached from the lens barrel 2 only by the operation (rotational operation) of the attaching and detaching operation portion 102. The lens drive adaptor 1 is held on the lens barrel 2 by the biasing force of the biasing spring 106, and accordingly a deterioration of an optical performance of the lens barrel 2 can be suppressed. Intervals (distances) between the held surfaces 201b of various lens barrels 2a and 2b with different outside diameters are constant, and accordingly the lens drive adaptor 1 can be attached to various lens barrels. Thus, according to this embodiment, a lens accessory, a lens apparatus, and an image pickup apparatus that are capable of being easily attached to various lens barrels with different sizes of outside diameters and that are capable of suppressing a deterioration of an optical performance of the lens barrel can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in this embodiment, the pair of holders are constituted by the fixed holder 104 and the movable holder 105, but this embodiment is not limited thereto, and alternatively both holders may be configured as movable holders where the advancing and retracting mechanisms (biasing mechanisms) of this embodiment are be provided at both holders. In this embodiment, the movable holder 105 is movable by the rotational operation, but this embodiment is not limited thereto, and alternatively it may be movable by an operation such as a linear operation other than the rotational operation.

This application claims the benefit of Japanese Patent Application No. 2016-025743, filed on Feb. 15, 2016, which is hereby incorporated by reference herein in its entirety.

What is claimed is:

1. A lens accessory detachably attached to a lens barrel, the lens accessory comprising:
    a first holder and a second holder configured to hold the lens barrel;
    an operation member configured to move at least one holder of the first holder and the second holder between a first position and a second position; and
    a biasing mechanism configured to apply a biasing force to the at least one holder so as to hold the lens barrel,
    wherein the biasing mechanism includes a first biasing member and a moving member that moves the at least one holder from the first position to the second position according to an operation of the operation member via the first biasing member, and
    wherein when the at least one holder contacts the lens barrel, the first biasing member is displaced by the moving member.

2. The lens accessory according to claim 1, wherein the moving member is biased by the first biasing member so as to be movable relatively to the at least one holder according to a movement of the at least one holder from the first position to the second position.

3. The lens accessory according to claim 1, wherein the operation member moves the at least one holder between the first position and the second position according to a rotational operation of the operation member.

4. The lens accessory according to claim 1,
    wherein the first position is a position where at least one of the first holder and the second holder is retractable from the lens barrel, and
    wherein the second position is a position where the lens barrel is capable of being held by using the first holder and the second holder.

5. The lens accessory according to claim 1,
    wherein the first holder is fixed, and
    wherein the second holder moves between the first position and the second position according to the operation of the operation member.

6. The lens accessory according to claim 5, wherein the biasing mechanism further includes a second biasing member that biases the second holder in a second direction opposite to a first direction.

7. The lens accessory according to claim 6,
    wherein the first biasing member is biased in the first direction by the moving member, and
    wherein the second biasing member is biased in the second direction by the moving member.

8. The lens accessory according to claim 7, wherein the first biasing member is provided between a receiving surface of the second holder and the moving member.

9. The lens accessory according to claim 7, wherein the biasing mechanism includes a transmission member that transmits a biasing force of the second biasing member to the moving member.

10. The lens accessory according to claim 7, wherein the operation member changes a biasing force in the first direction that is applied to the second holder by the first biasing member according to a rotational operation of the operation member.

11. The lens accessory according to claim 10,
    wherein the operation member is provided with an inclined surface to change the biasing force, and
    wherein the moving member is biased to the inclined surface of the operation member by the second biasing member.

12. The lens accessory according to claim 11, wherein the moving member moves while maintaining a state of contacting the inclined surface of the operation member to move the second holder between the first position and the second position according to the rotational operation of the operation member.

13. The lens accessory according to claim 10,
    wherein the moving member is inserted into an elongate hole formed on the second holder,
    wherein the elongate hole of the moving member includes a first end portion that restricts a movement of the moving member in the first direction and a second end portion that restricts a movement of the moving member in the second direction, and
    wherein the moving member is biased toward the second end portion according to a reaction force of the biasing force by the first biasing member.

14. The lens accessory according to claim 1, wherein the lens accessory is a lens drive adapter for driving an operation ring of the lens barrel.

15. A lens apparatus comprising:
    a lens barrel; and
    a lens accessory detachably attached to the lens barrel,
    wherein the lens accessory comprises:
        a first holder and a second holder configured to hold the lens barrel;
        an operation member configured to move at least one of the first holder and the second holder between a first position and a second position; and
        a biasing mechanism configured to apply a biasing force to at least one of the first holder and the second holder so as to hold the lens barrel, and
    wherein the operation member moves at least one of the first holder and the second holder between the first position and the second position according to a rotational operation of the operation member.

16. An image pickup apparatus comprising:
a lens barrel;
an image sensor configured to photoelectrically convert an optical image formed via the lens barrel to output image data; and
a lens accessory detachably attached to the lens barrel,
wherein the lens accessory comprises:
- a first holder and a second holder configured to hold the lens barrel;
- an operation member configured to move at least one of the first holder and the second holder between a first position and a second position; and
- a biasing mechanism configured to apply a biasing force to at least one of the first holder and the second holder so as to hold the lens barrel, and wherein the operation member moves at least one of the first holder and the second holder between the first position and the second position according to a rotational operation of the operation member.

* * * * *